United States Patent
Bickerstaff et al.

(10) Patent No.: US 10,095,032 B2
(45) Date of Patent: Oct. 9, 2018

(54) HANDLING DIFFERENT INPUT SIGNALS

(71) Applicant: Sony Interactive Entertainment Europe Limited, London (GB)

(72) Inventors: Ian Henry Bickerstaff, London (GB); Simon Mark Benson, London (GB)

(73) Assignee: Sony Interactive Entertainment Europe Limited (GB)

( * ) Notice: Subject to any disclaimer, the term of this patent is extended or adjusted under 35 U.S.C. 154(b) by 588 days.

(21) Appl. No.: 14/300,649

(22) Filed: Jun. 10, 2014

(65) Prior Publication Data
US 2014/0362180 A1    Dec. 11, 2014

(30) Foreign Application Priority Data

Jun. 11, 2013   (GB) .................................. 1310360.1
Aug. 21, 2013   (GB) .................................. 1314969.5

(51) Int. Cl.
| | | |
|---|---|---|
| *G02B 3/08* | (2006.01) |
| *H04N 9/47* | (2006.01) |
| *H04N 15/00* | (2006.01) |
| *H04N 13/00* | (2018.01) |
| *G02B 27/01* | (2006.01) |

(Continued)

(52) U.S. Cl.
CPC ..... *G02B 27/0172* (2013.01); *G02B 27/0093* (2013.01); *G02B 27/017* (2013.01); *H04N 13/044* (2013.01); *H04N 13/0452* (2013.01); *G02B 2027/014* (2013.01); *G02B 2027/0127* (2013.01); *G02B 2027/0134* (2013.01); *G02B 2027/0187* (2013.01)

(58) Field of Classification Search
CPC .......... G02B 2027/0178; G02B 27/017; H04N 13/044
See application file for complete search history.

(56) References Cited

U.S. PATENT DOCUMENTS 5,473,365 A    12/1995    Okamura
5,539,422 A *   7/1996    Heacock ............ G02B 27/0172
                                                             345/8
(Continued)

FOREIGN PATENT DOCUMENTS

EP    1731943 A1    12/2006
EP    2023293 A2     2/2009
(Continued)

OTHER PUBLICATIONS

Search Report for Application No. GB1410403.8 dated Nov. 12, 2015.
(Continued)

*Primary Examiner* — Rebecca Volentine
(74) *Attorney, Agent, or Firm* — Lerner, David, Littenberg, Krumholz & Mentlik, LLP

(57) ABSTRACT

A head mountable display (HMD) system in which the size and/or distance from the viewer of a virtual screen for display of video material depends upon one or more of the following:
- whether the video material is in a 2-D or a 3-D format;
- the image resolution of the video material;
- the compression quality and/or data rate of the video material;
- the aspect ratio of the video material;
- the origin of the video material; and
- metadata associated with the video material.

17 Claims, 10 Drawing Sheets

(51) Int. Cl.
 *H04N 13/04* (2006.01)
 *G02B 27/00* (2006.01)

(56) References Cited

U.S. PATENT DOCUMENTS

| | | | | |
|---|---|---|---|---|
| 6,417,970 | B1* | 7/2002 | Travers | G02B 27/0081 |
| | | | | 359/630 |
| 8,705,177 | B1* | 4/2014 | Miao | G02B 27/0172 |
| | | | | 345/8 |
| 2001/0013960 | A1 | 8/2001 | Popovich et al. | |
| 2002/0093467 | A1 | 7/2002 | Tidwell et al. | |
| 2002/0126396 | A1* | 9/2002 | Dolgoff | G02B 27/2278 |
| | | | | 359/743 |
| 2003/0117719 | A1* | 6/2003 | Wakai | G02B 13/0045 |
| | | | | 359/726 |
| 2003/0201911 | A1 | 10/2003 | Kennedy | |
| 2005/0195277 | A1* | 9/2005 | Yamasaki | G02B 27/017 |
| | | | | 348/61 |
| 2006/0119617 | A1* | 6/2006 | Toyooka | G09G 3/2092 |
| | | | | 345/619 |
| 2007/0097021 | A1 | 5/2007 | Yamazaki et al. | |
| 2007/0126928 | A1* | 6/2007 | Klompnhouwer | H04N 5/21 |
| | | | | 348/497 |
| 2007/0268316 | A1* | 11/2007 | Kajita | G06T 5/006 |
| | | | | 345/642 |
| 2010/0103077 | A1* | 4/2010 | Sugiyama | G02B 27/017 |
| | | | | 345/8 |
| 2010/0157433 | A1 | 6/2010 | Mukawa et al. | |
| 2011/0102558 | A1* | 5/2011 | Moliton | H04N 13/0022 |
| | | | | 348/54 |
| 2011/0234476 | A1* | 9/2011 | Sugihara | G02B 27/0172 |
| | | | | 345/8 |
| 2011/0245670 | A1 | 10/2011 | Tashiro et al. | |
| 2011/0273543 | A1* | 11/2011 | Ushio | G02B 27/0172 |
| | | | | 348/54 |
| 2012/0062444 | A1* | 3/2012 | Cok | G02B 27/0172 |
| | | | | 345/8 |
| 2012/0086625 | A1* | 4/2012 | Takeda | G02B 6/0006 |
| | | | | 345/8 |
| 2012/0206569 | A1* | 8/2012 | Verdier | G06T 3/4007 |
| | | | | 348/43 |
| 2013/0215147 | A1* | 8/2013 | Hilkes | G02B 27/017 |
| | | | | 345/633 |
| 2014/0006026 | A1* | 1/2014 | Lamb | H03G 3/10 |
| | | | | 704/246 |
| 2014/0043211 | A1* | 2/2014 | Park | G02B 27/017 |
| | | | | 345/8 |
| 2015/0205135 | A1 | 7/2015 | Border et al. | |

FOREIGN PATENT DOCUMENTS

| | | |
|---|---|---|
| EP | 2490182 A1 | 8/2012 |
| JP | 08256300 | 1/1996 |
| JP | 2013015395 A | 1/2013 |
| WO | 9608736 A2 | 3/1996 |
| WO | 2008070683 A1 | 6/2008 |
| WO | 2011112296 A1 | 9/2011 |
| WO | 2013155217 A1 | 10/2013 |
| WO | 2014168995 A1 | 10/2014 |

OTHER PUBLICATIONS

Search Report for Application No. GB 1310360.1 dated Nov. 30, 2013.

Search Report for Application No. GB 1314969.5 dated Feb. 20, 2014.

* cited by examiner

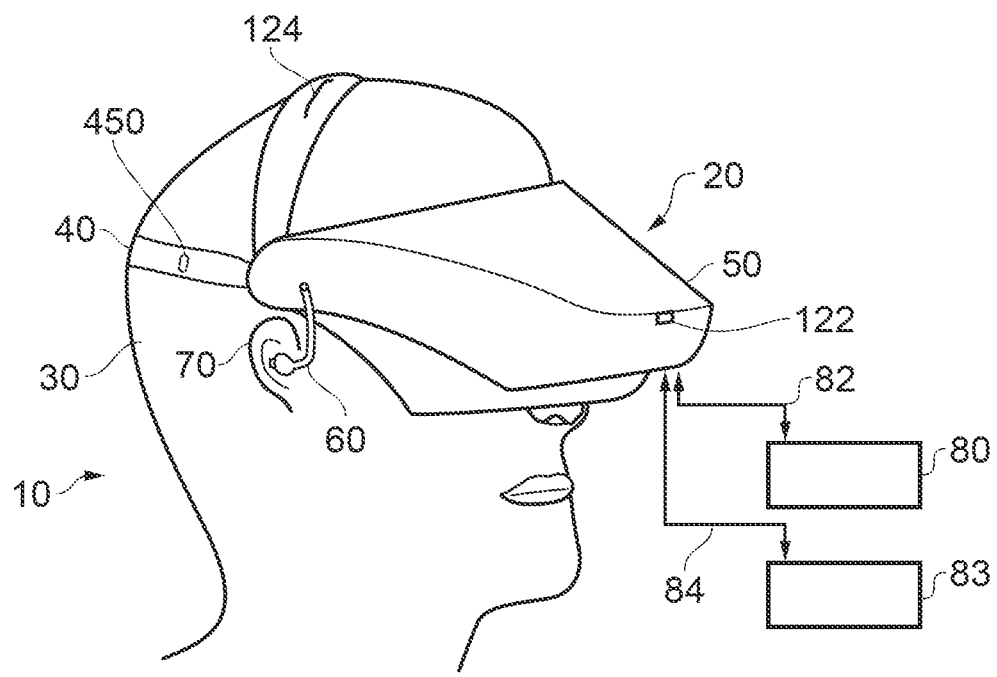

HANDLING DIFFERENT INPUT SIGNALS

CROSS REFERENCE TO RELATED APPLICATION

The present application claims the benefit of and priority to UK Patent Application No. GB 1310360.1, filed Jun. 11, 2013, and UK Patent Application No. GB1314969.5, filed Aug. 21, 2013, the entire contents of which applications are incorporated herein by reference.

BACKGROUND

Field of the Disclosure

This invention relates to head-mountable apparatus and systems.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A head-mountable display (HMD) is one example of a head-mountable apparatus. Audio headphones comprising a frame supporting one or more audio transducers are another example of a head-mountable apparatus. A head-mounted torch or light is a further example of a head-mountable apparatus. The following background discussions will relate mainly to HMDs, but the principles are also applicable to other types of head-mountable apparatus.

In an HMD, an image or video display device is provided which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the users eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimeters from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses or other optical components which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

Various aspects and features of the present invention are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 schematically illustrates an HMD worn by a user;

FIG. 2 is a schematic plan view of an HMD;

DESCRIPTION OF THE EMBODIMENTS

Figure 3:
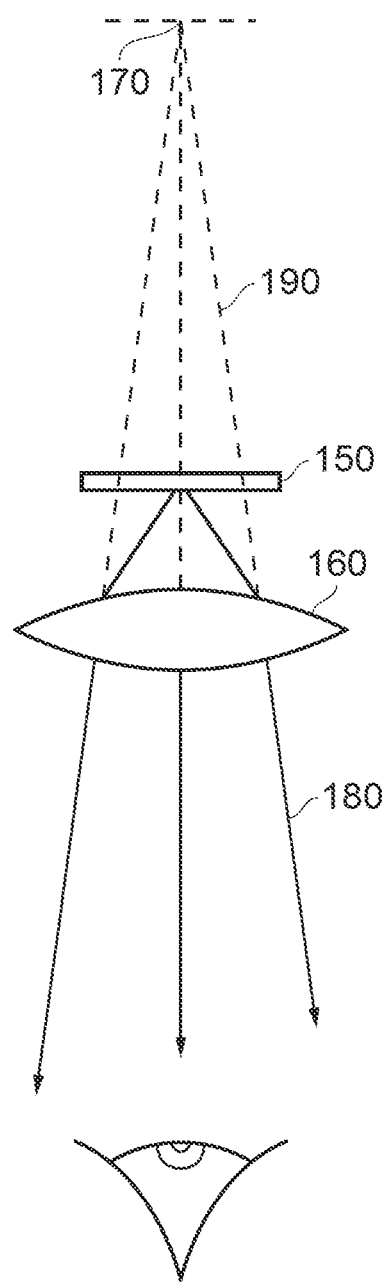
FIG. 3 schematically illustrates the formation of a virtual image by an HMD.

Referring now to FIG. 1, a user 10 is wearing an HMD 20 (as an example of a generic head-mountable apparatus— other examples including audio headphones or a head-mountable light source) on the user's head 30. The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the users left and right ears 70. The earpieces 60 replay an audio signal provided from an external source, which may be the same as the video signal source which provides the video signal for display to the users eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the users view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the users eyes and the relative position 110 of the users nose. The display portion 50, in schematic form, comprises an exterior shield 120 to mask ambient light from the users eyes and an internal shield 130 which prevents one eye from seeing the display intended for the other eye. The combination of the users face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
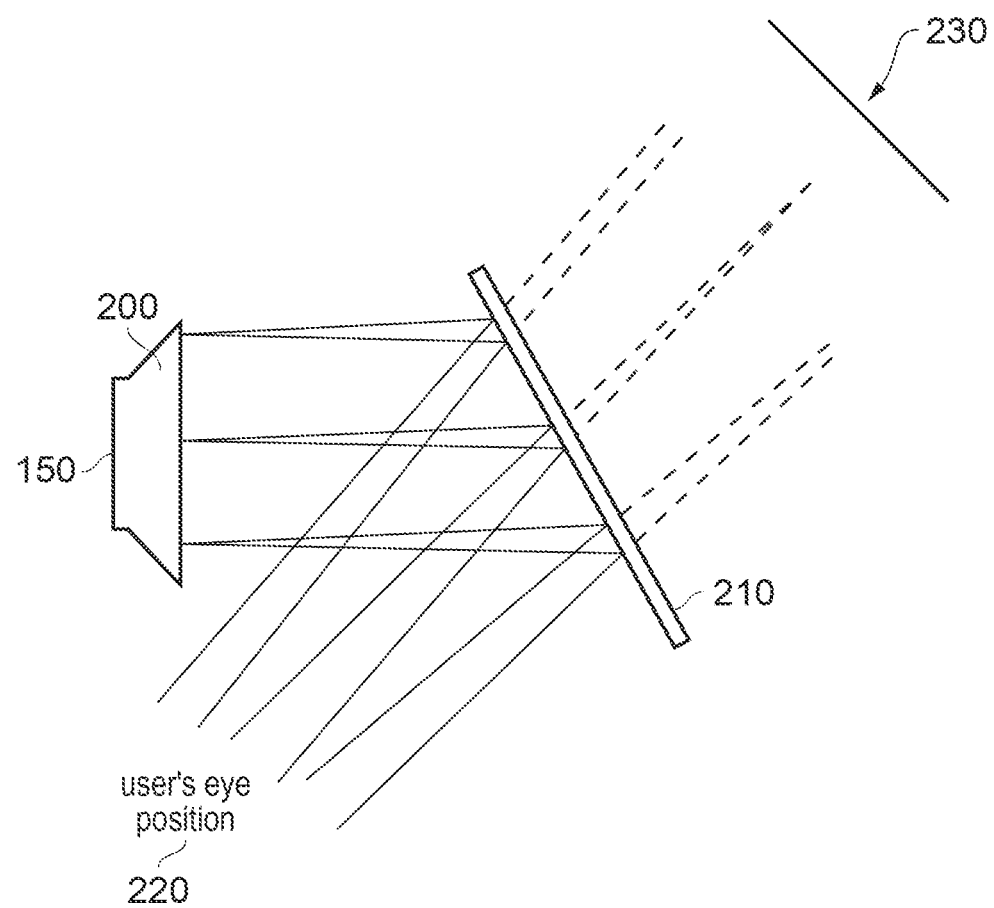
FIG. 4 schematically illustrates another type of display for use in an HMD.

An alternative arrangement is shown in FIG. 4. This arrangement may be used where it is desired that the users view of the external environment is not entirely obscured. However, it is also applicable to HMDs in which the users external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the users view of the external surroundings is entirely obscured, the mirror 210 can be a substantially 100% reflective mirror. The arrangement of FIG. 4 then has the advantage that the display element and optical elements can be located closer to the centre of gravity of the users head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
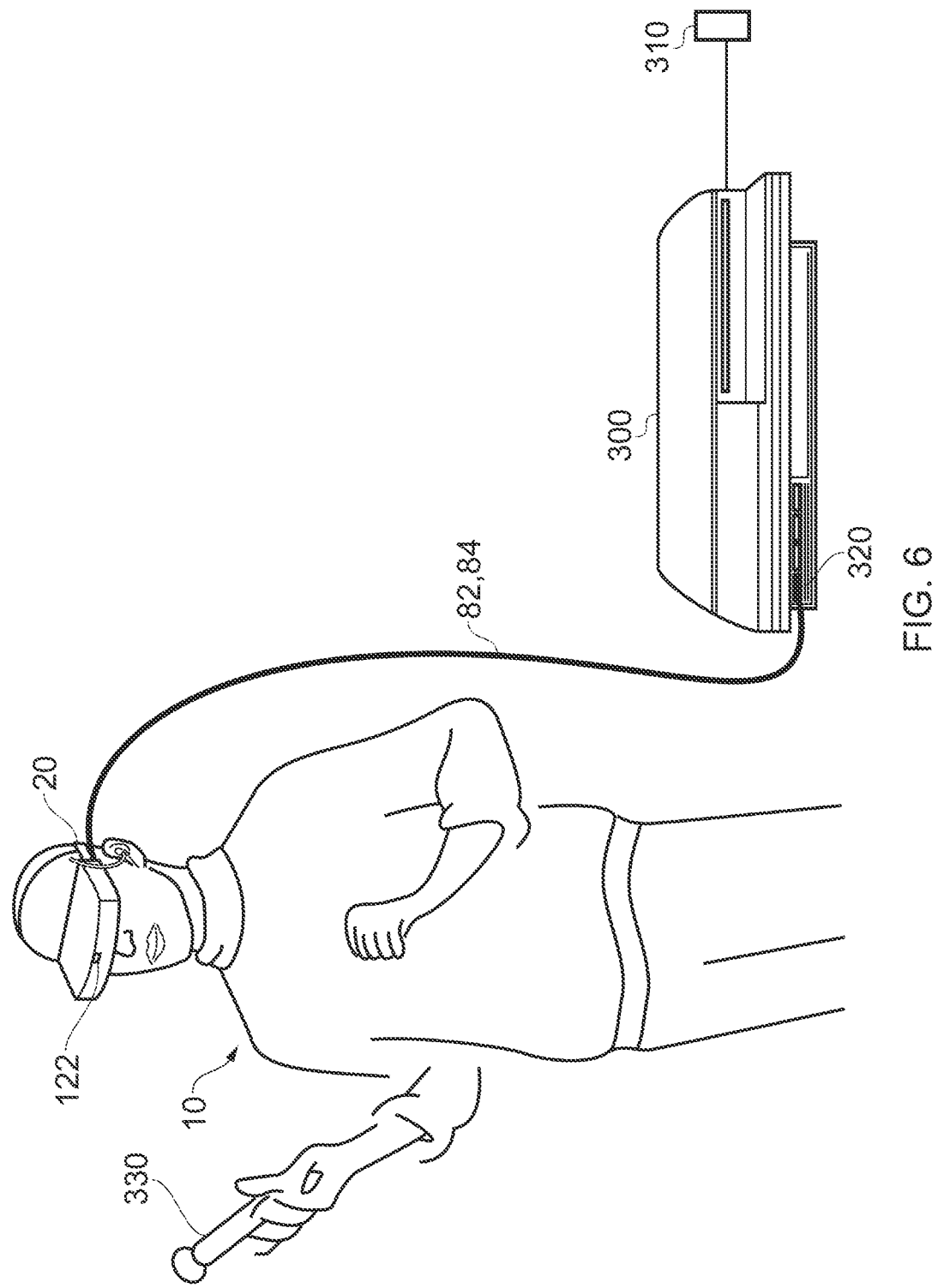
FIGS. 6 and 7 schematically illustrate a user wearing an HMD connected to a Sony® PlayStation 3® games console.

FIG. 6 schematically illustrates a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84. In FIG. 6, the user is also shown holding a hand-held controller 330 which may be, for example, a Sony® Move® controller which communicates wirelessly with the games console 300 to control (or to contribute to the control of) game operations relating to a currently executed game program.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

Figure 7:
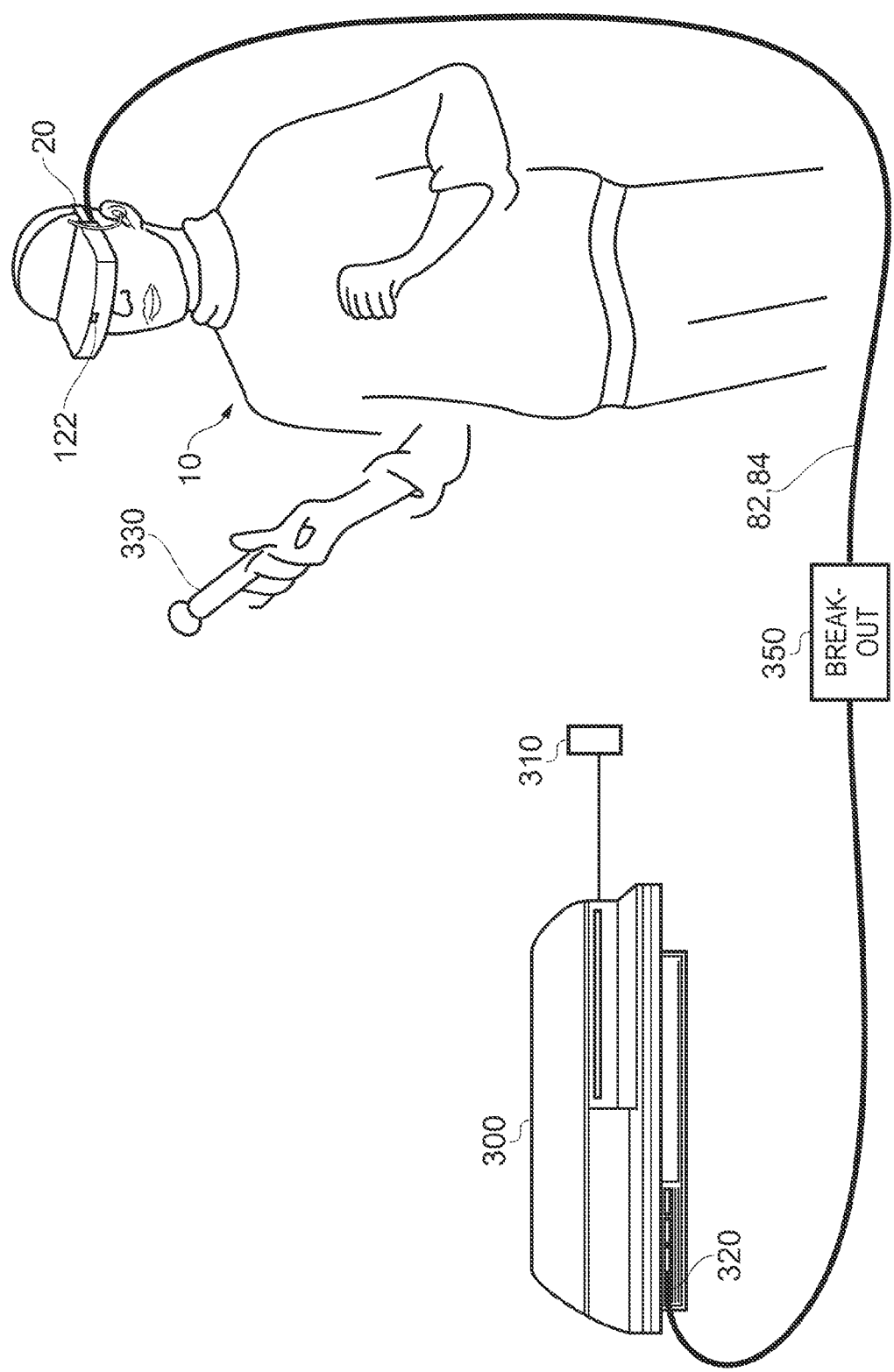

FIG. 7 schematically illustrates a similar arrangement in which the games console is connected (by a wired or wireless link) to a so-called "break out box" acting as a base or intermediate device 350, to which the HMD 20 is connected by a cabled link 82,84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
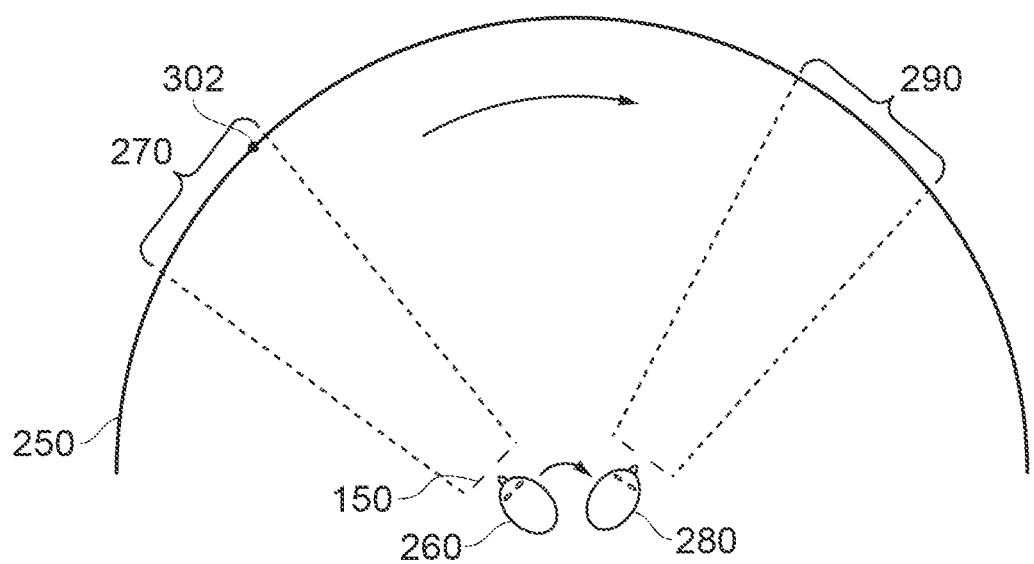
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 9A:
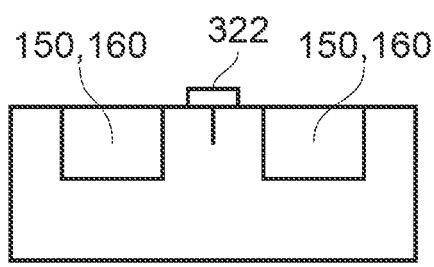
FIGS. 9a and 9b schematically illustrate HMDs with motion sensing.
Figure 9B:
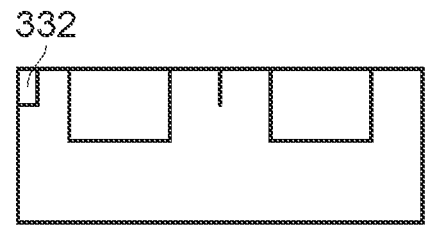

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezo-electric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
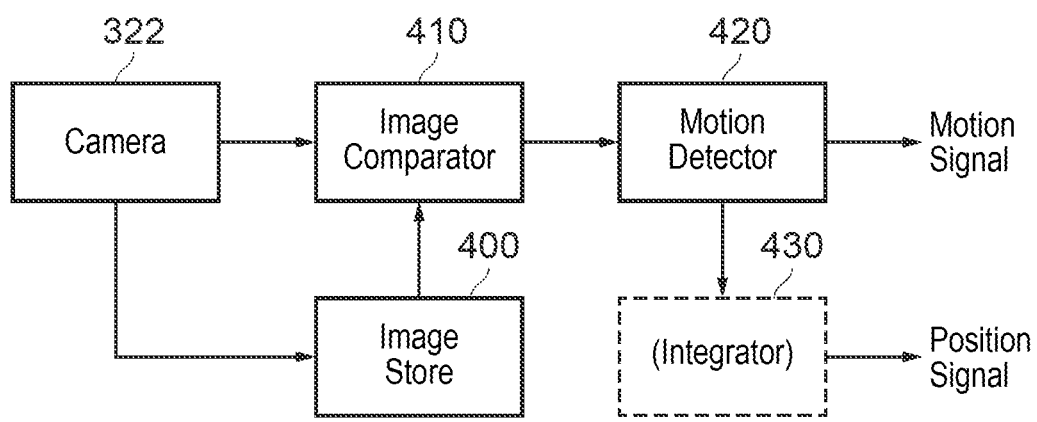
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
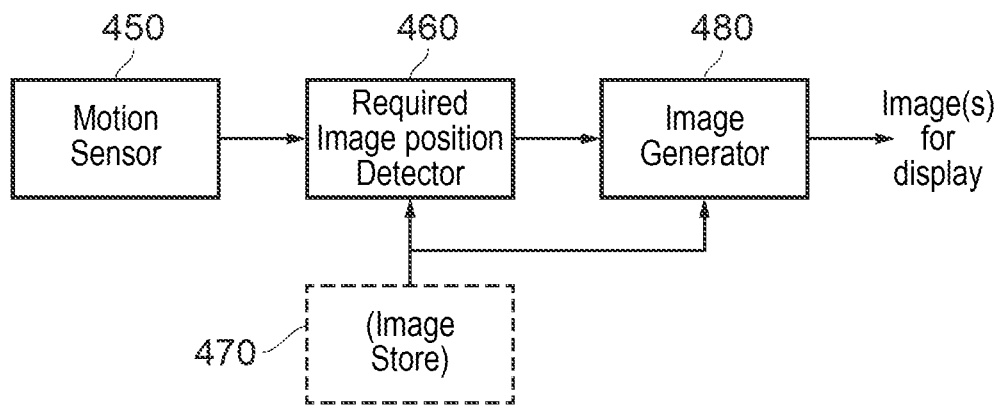
FIG. 11 schematically illustrates the generation of images in response to HMD position or motion detection.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
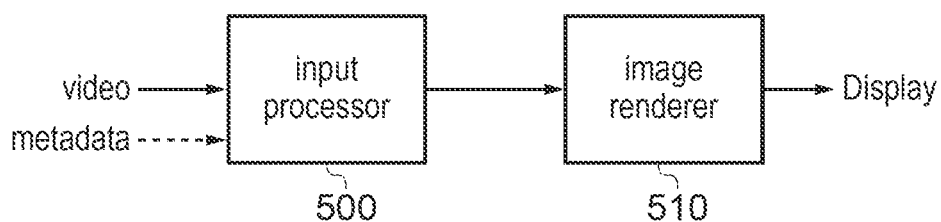
FIG. 12 schematically illustrates part of the functionality of an HMD.

FIG. 12 schematically illustrates part of the functionality of an HMD of the type described above.

The functionality shown in FIG. 12 relate to the display, by the HMD, of image or video material, representing video content, game content, computer generated content or the like. For the purposes of the discussion below, these will be referred to as "video material." Additionally, audio material can be presented to the user. Features relating to the presentation of audio material, which can act in cooperation with the features to be discussed with reference to FIG. 12, will be discussed below.

The features shown in FIG. 12 are an input processor 500 and an image renderer 510. The input processor 500 receives input video data and, optionally, input metadata relating to the video data. The image renderer 510 generates successive images for display by the display elements of the HMD. Either or both of the input processor 500 and the image renderer 510 can be implemented by hardware or processing at the games machine 300, the HMD 20, the break-out box 350 (if provided) or a combination of these.

As discussed below, FIG. 12, when connected to an HMD of the type described above, provides an example of a head mountable display (HMD) system comprising an HMD having display elements for the eyes of a wearer of the HMD, the display elements being configured to provide a virtual screen to the HMD wearer; and a video processor for processing video material for display by the display elements of the HMD; in which the video processor is configured so that the size and/or distance from the wearer of the virtual screen for display of video material by the HMD depends upon one or more of the following: whether the video material is in a 2-D or a 3-D format; the image resolution of the video material; the compression quality and/or data rate of the video material; the aspect ratio of the video material; the spatial frequency content of the video material; and metadata associated with the video material.

Operations of the arrangement shown in FIG. 12 will be described with reference to the flowchart of FIG. 13. The underlying principles of the operations are that a display format and a display position (that is to say, the rendered virtual position of a virtual display screen within the 3-D environment provided by the stereoscopic displays of the HMD) are selected in dependence upon properties of the input video data.

Figure 13:
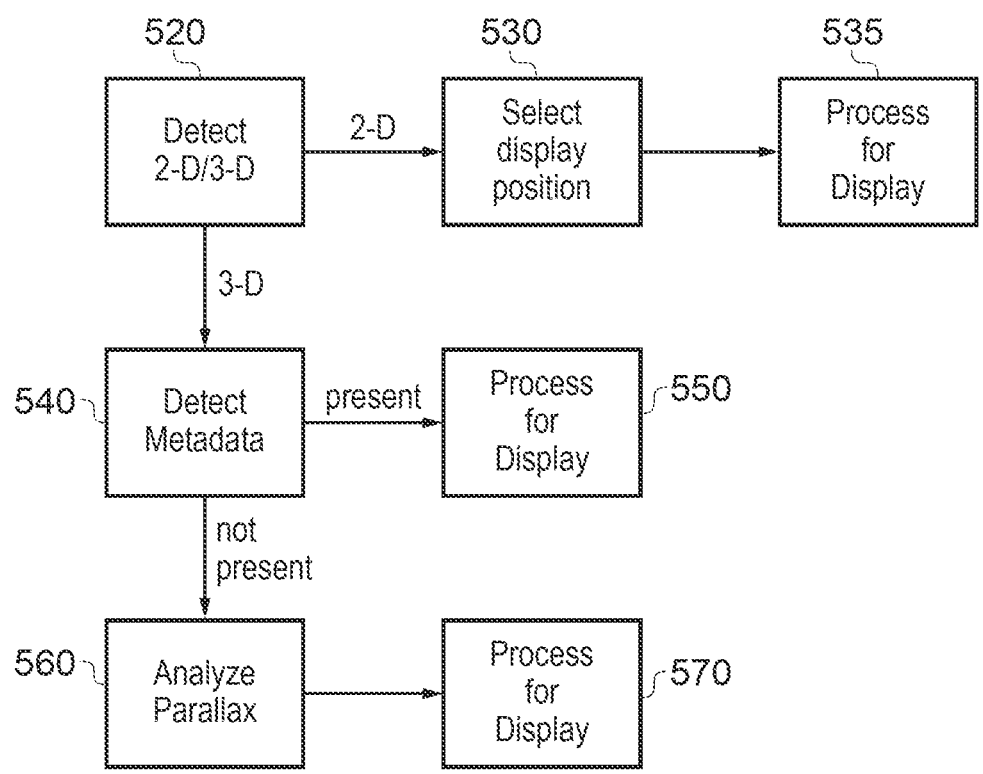
FIG. 13 is a schematically flowchart which illustrates part of the operation of an HMD.

Referring to FIG. 13, at a step 520 the input processor 500 detects whether the input video data represents 2-D or 3-D video material. This detection can be made either from metadata accompanying the video data or simply by an analysis of the basic format of the received video data.

If the input video data represents 2-D video material, then at a step 530 the input processor 500 selects a display position. In embodiments of the invention, the display position is selected according to the resolution and/or compression quality and/or data rate and/or spatial frequency content of the input video data.

For example, if the input video data represents high-definition video material (where high-definition may be defined as having at least, say, 720 lines of pixels in each image) and video material of at least a threshold data rate (where the data rate is treated as a proxy for compression quality), then the display position selected at the step 530 is that of a large virtual screen at a long virtual distance from the viewer, so as to simulate a cinema experience.

Applying some example numbers to this discussion, the threshold data rate might be, for example, 10 Mbps, 20 Mbps or 30 Mbps, the virtual screen may have, for example, a 10 m diagonal and may be positioned, say, 20 m from the viewer in the virtual 3-D environment. But of course the skilled person will appreciate that other values may be used.

If the input video data does not represent high-definition video material of at least the threshold data rate, then at the step 530 the input processor selects a display position for the video material so as to simulate a domestic television setting, which is to say that the virtual screen is smaller and closer to the user. Here, for example, the virtual screen may be rendered with a virtual size of a 1.5 m diagonal, at a virtual distance of, say, 5 m from the viewer. Again, the skilled person will realise that other values may be used.

In some embodiments, the input processor 500 is operable, at the step 530, to detect the spatial frequency content of the video material. Example techniques for achieving this will be discussed with reference to FIGS. 14-16B, which discuss example arrangements providing a detector configured to detect the spatial frequency content of the video material; the video processor being configured to display the video material on a virtual screen having a size and virtual distance from the wearer of the HMD according to the detected spatial frequency content of the video material.

A detection of spatial frequency content is significant in the present context, because in some circumstances neither the pixel count (for example, 1080 lines of pixels) nor the data rate (for example 30 Mbps) may give a definitive indication of the provenance of the video material in terms of its resolution as originally captured. This is, in part, because both the pixel count and the data rate depends to some extent on the medium on which the video material is currently stored and the way in which it is intended for display. So, even a movie from the 1930s can be processed so as to be represented in high-definition (for example, 1080 lines of pixels) and at a high data rate, for example in situations where the movie is to be marketed by distribution on a Blu-ray disc. Even though such a recording may be portrayed as "digitally remastered", there are certain fundamental qualities of the video material which are restricted by the properties of the medium and equipment used at the time of the original capture of the video material. So, although sharper edges of features can be simulated in the "digitally remastered" video, image features which were simply not captured at all at the time of original capture of the material cannot be reintroduced by a remastering process. Therefore, in this type of situation, the actual spatial frequency content of the video material may be rather less than the normal spatial frequency content of newly captured video material having that data rate and that pixel count. In such situations, where the spatial content of the video material indicates a lower capture resolution than the current resolution of the video material, the video processor is configured to display the video material on a virtual screen having a size and virtual distance from the wearer which depend on the capture resolution indicated by the detected spatial frequency content.

In embodiments of the present disclosure, the actual spatial frequency content of video material is detected and is used, at least in part, to determine the manner by which the HMD displays the video material. Also, as mentioned above and discussed in more detail below, the manner by which audio material is presented to the user can also depend upon this detection.

Figure 14:
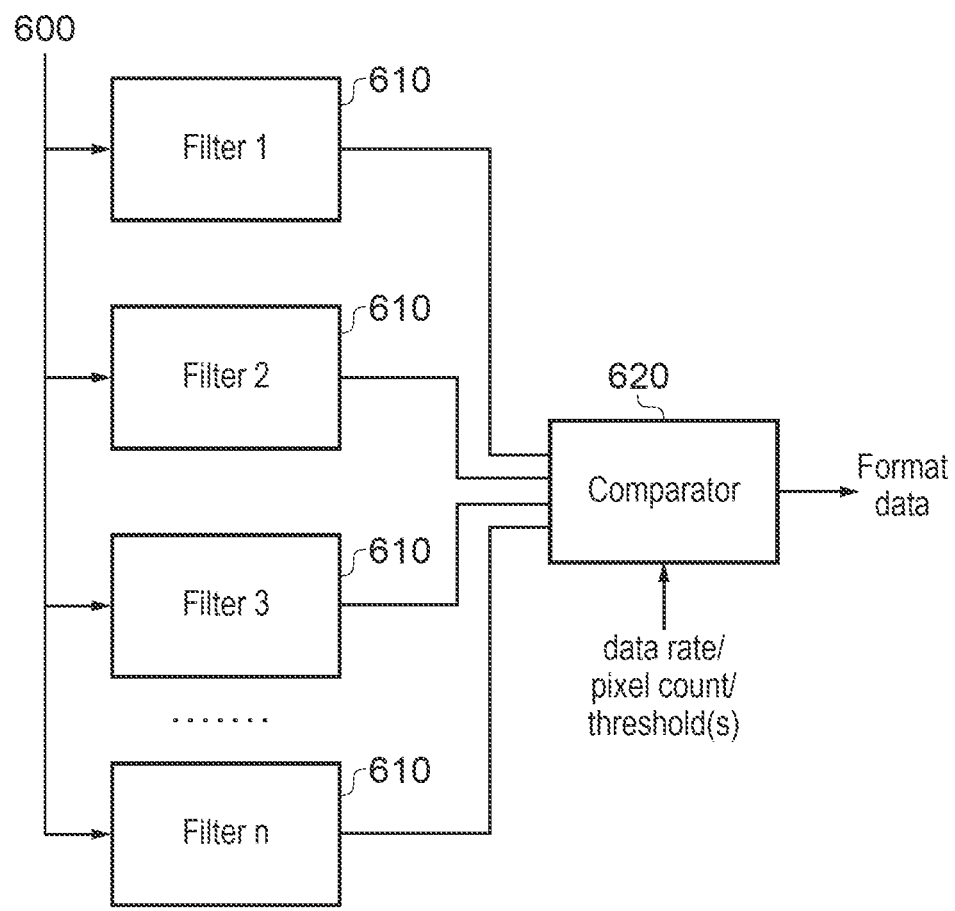
FIG. 14 schematically illustrates a filter array.

FIG. 14 schematically illustrates one arrangement for detecting the spatial frequency content of video material 600. The video material is supplied to a filter bank formed of n filters 610, each of which acts to separate from the video material 600 a respective range of spatial frequencies. For example, a lowest spatial frequency range filter could be a low-pass filter, a filter representing the highest spatial frequency range could be a high-pass filter, and filters in between these two ranges could be band-pass filters. Any number of filters, one or more, may be used. If only one filter is provided, then the one filter would be a high pass filter so as to detect the presence or absence of high spatial frequency components in the video material 600 (on the basis that even the poorest quality originally captured material would have low spatial frequency components present, but the presence of high spatial frequency components can be indicative of the original provenance of the video material). However, more than one filter may be used so that a comparison may be made between the levels of different frequency components within the video material.

The filters may be digital filters, for example multi-tap spatial frequency digital filters. The filters may act on every image of video material or may act on a sample of one or more images. Not all of an image needs to be filtered; sample regions could be selected.

A comparator 620 detect the relative content at different spatial frequency ranges. If more than one filter is used, or for comparison with the overall content of the sampled image regions is provided, then the comparator 620 can implement the detection of whether the spatial frequency content of the video material is significantly less than that normally associated with the same data rate and pixel count by detecting whether the higher spatial frequency content represents less than a predetermined proportion of the lower spatial frequency content. Alternatively, spatial frequency content in one or more ranges can be compared against one or more respective thresholds. In any of these cases, the output of the comparator 620 is an indication, to be referred to as "format data", of the original format of the video material at the time of capture.

A further detection can be made by the comparator 620, in that if the spatial frequency content of sample regions at the periphery of the video material (for example, the left and right edges) is very low or substantially zero, this can indicate that the video material has a different aspect ratio to that provided by the format under which it is currently stored. For example, an old movie may have a less widescreen aspect ratio than that provided by the storage of video material on a Blu-ray disc.

Figure 15:
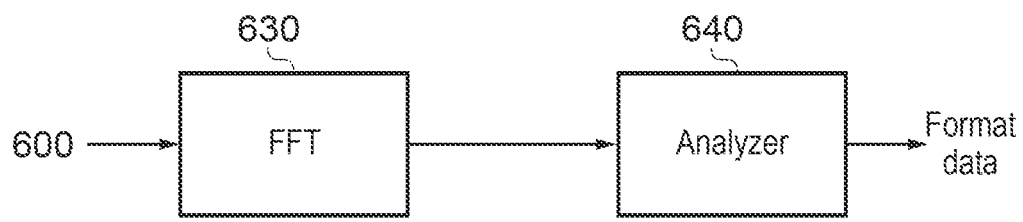
FIG. 15 schematically illustrates an analyser.

FIG. 15 schematically illustrates another technique, which is to use a fast Fourier transform (FFT) or similar spatial frequency analyser 630 to detect the spatial frequency content of the video material 600, with the output of the FFT analyser 630 being provided to an analyser 640 which carries out functions corresponding to those of the comparator 620 to generate the format data.

Figure 16A:
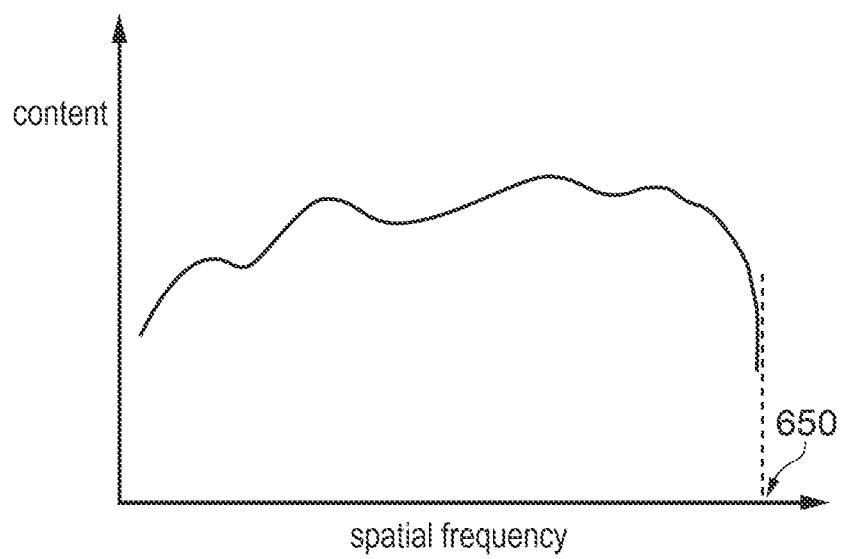
FIGS. 16a and 16b schematically illustrate graphs of spatial frequency content.
Figure 16B:
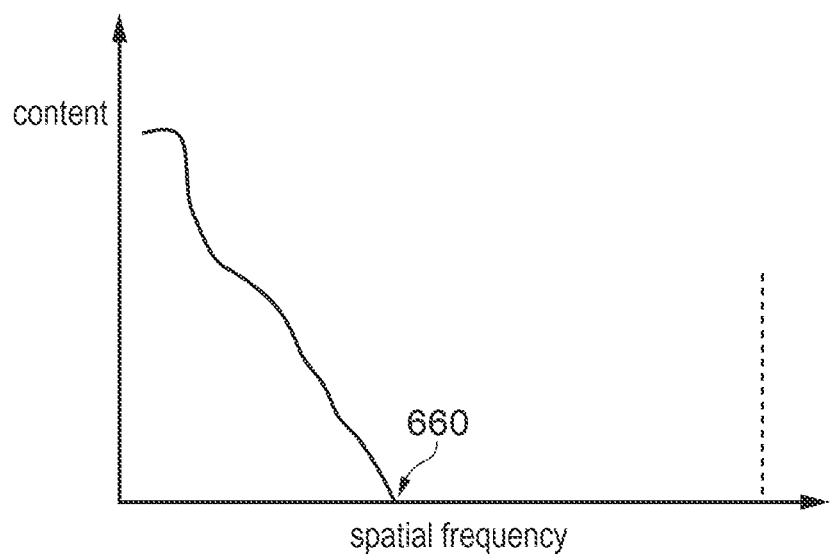

FIG. 16a schematically illustrates the spatial frequency content of an example it of video material captured using modern techniques. The spatial frequencies extend to a maximum frequency 650, for example a maximum frequency determined by the sampling rate in use. In contrast, in FIG. 16b, the spatial frequency content extends as far as a much lower maximum 660, lower than the maximum frequency determined by the sampling rate in use for the medium and format by which the video material is currently stored. This indicates that the video material has been remastered so as to be stored at a higher data rate and/or pixel count then its provenance would otherwise have justified. In this way, although video material, even if stored and presented in a newer data format, can be detected.

Once the display position has been selected at the step 530, the 2-D data is processed for display by the image renderer 510 at a step 535, according to the parameters set by the step 530.

For older video material, for example video material detected using the techniques described above to have a spatial frequency content below a particular threshold, the display of the video material is set by the step 530 to be representative (in the virtual world presented by the HMD) of a smaller screen closer to the user. Different thresholds may be applied in this process. For example, for video material having a maximum spatial frequency content of f1, which may be a figure indicative of (say) 405 line video capture or 1920s movie capture, the material is presented on a virtual screen which is (say) no more than 2 m from the user and no more than 0.5 m diagonal. For a maximum spatial frequency content of f2, indicative of (say) 625 line video capture or up to 1960s movie capture, the material is presented on a virtual screen which is (say) 4 m from the user and 1 m diagonal.

It will be appreciated that the detection of a "maximum" spatial frequency content is subject to the normal procedures associated with defining frequency bands associated with filtering operations and the like. So, although a "maximum"

spatial frequency content could be used as an absolute term (the image has absolutely no spatial frequency above that frequency boundary), in embodiments it is used to indicate that the spatial frequency content of the image has dropped to below a threshold proportion of its maximum, or below an absolute but non-zero threshold. For example, the maximum spatial frequency in an image could be taken as that spatial frequency above which no more than (say) 1% of the peak spatial frequency level for that image is detected.

If, at the step 520, the input video data is detected to represent 3-D video material, control passes to the step 540 at which the input processor 500 detects whether metadata is present alongside the video data. Here, the reference to metadata refers to a particular type of metadata which defines so-called windowing of the 3-D material for display.

A problem which can occur with the display of 3-D content relates to so-called window violations, and exhibits itself when an object in the 3-D environment approaches the edge of the display screen and, by virtue of its position in 3-D space and the particular camera arrangements in use, the object appears in only one of the left and right images but not the other. This can be disconcerting for the viewer and can damage the illusion of the 3-D representation. To address this, some 3-D video material has associated metadata defining temporary changes to the lateral extent of the left and right images so as to mask objects which would otherwise give rise to window violations.

If such metadata is present, then at a step 550 the video material is processed for display. As part of measures to avoid window violations, or at least to reduce their severity, the 3-D material is rendered on a virtual video screen which is relatively close to the viewer, for example being 2-3 m from the viewer and having a diagonal of, say, 2 m. As before, the skilled person will appreciate that other values could be used for these dimensions. The metadata is used in the rendering of the video material by the image renderer 510, in particular to control the lateral extent of the left and right images.

If the appropriate metadata of the type described above is not present, then at a step 560 the input processor 500 analyses the input video data, in particular to detect potential window violations and to detect objects at the lateral peripheries of the video material which appear in one image but not the other. When such objects are detected, then at a step 570 the left or right edge of the left or right image can be cropped to remove the object giving rise to a potential window violation, and/or a so-called "floating window" (a movable mask) can be applied using known techniques.

The video material as processed at the step 570 is then rendered by the image renderer 510 using a virtual video screen similar to that described above for 3-D material.

Other measures which can be taken in respect of the display of video material include the following:

Display so-called cut scenes in videogames in 2-D, even though the video game itself may be rendered in 3-D. Cut scenes represent pre-prepared video content which bridges from one videogame scenario to another. These may have been prepared in 2-D and the game later adapted for 3-D display, so transitioning to a 2-D display for the cut scenes avoids the need to re-master the cut scenes.

When using the head motion tracking features of the HMD as described above, so as to change the rendered video material in dependence upon head position (for example, to make it appear to the user that the video material is locked to a real position and the viewer may observe different parts of the video material by moving his head) it may be appropriate to respond only to changes in the yaw (lateral rotation) and/or pitch (vertical rotation) of the HMD, but for the system not respond to detected lateral translation of the HMD. This is particularly applicable in the case of the display of 3-D video material, because it prevents the user trying to "peer" around the edges of a virtual 3-D screen. If a user was able to move his head so as to see behind the edges of the virtual 3-D screen, this could lead to damage to the illusion of 3-D space and/or to window violations.

During a transition between different video formats, the virtual screen may be transitioned steadily between the different respective virtual screen sizes and virtual screen positions.

Detect the aspect ratio of the material, as a 4:3 aspect ratio can indicate older (lower resolution) content.

Detect both the resolution and the aspect ratio of the video, and basing the display technique on both factors. For example, 4:3 aspect ratio material could be older content (which would indicate a smaller display size, possible situated (in 3D space) nearer to the viewer, or it could be (for example) so-called Imax content having a very high resolution such as 1440×1080, which would indicate display on an apparently larger virtual screen, situated further from the viewer.

Detect the origin of the material. For example, the video material could be formed of a series of still images, for example from a photograph folder or directory (which could be on a games machine such as the machine 300). Note that although this relates to still images, they are displayed as video material to the user. If such an origin is detected, the still images could be displayed in a photo gallery format, for example as a succession of still images or as pictures on the walls of a virtual art gallery, which the user can (virtually) move around.

Associate metadata with the video material indicating a preferred display format (from the various options described here, for example)

Change the display format within a single video programme. For example, if archive (older) material is incorporated into a television programme the newer (probably higher definition) material could be displayed in one format, and the older archive material in another format. The switch between formats could be instigated by detecting the resolution of the material, or the spatial frequency content of the material (to detect older lower resolution material which has been upscaled to a higher resolution for transmission or storage), or by accompanying metadata.

Figure 17:
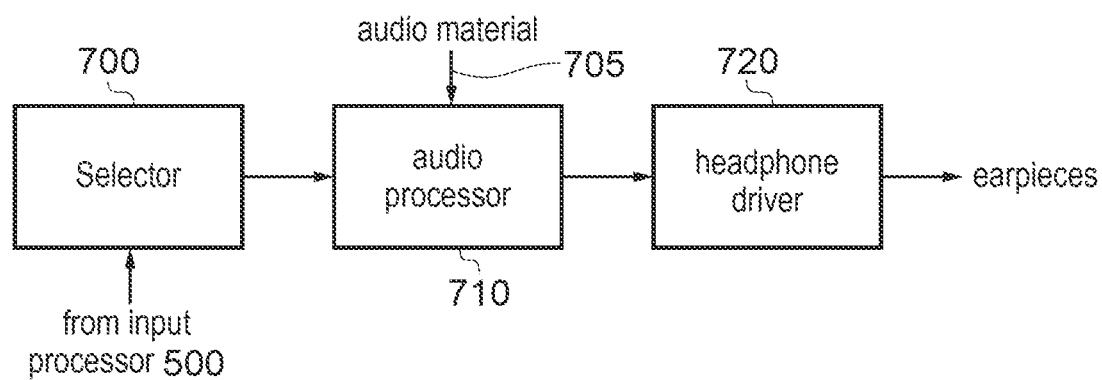
FIG. 17 schematically illustrates an audio processor.

FIG. 17 schematically illustrates a corresponding process applicable in respect of audio signals associated with the video material for display. So, the arrangement of FIG. 17 operates in association with the arrangements of FIGS. 12 and 13, for example. FIG. 17 provides an example of an audio processor configured to generate audio content in a simulated audio presentation format dependent upon the size and/or distance of the virtual screen from the wearer selected by the video processor.

Referring to FIG. 17, a selector 700 receives data form the input processor 500 of FIG. 12 indicative of the video display format selected by the input processor (using the techniques discussed above) for display of the current video material. In response to this data, the selector 700 selects an audio format for presentation of associated audio material 705 to the user. An audio processor processes the audio material 705 according to the selected audio format and supplies the processed audio data, via a headphone driver (such as an amplifier and impedance matcher) 720 to earpieces to be worn by the HMD wearer.

The audio processor 705 is operable with respect to a so-called 3-D audio system so that virtual sound sources can be simulated in any direction with respect to the earpiece wearer's head.

Example Audio Formats Include:
(i) for 3-D video material, a full 3-D audio format;
(ii) for 2-D video material having at least a threshold pixel count (for example, 1080 lines) and a spatial frequency range appropriate to that pixel count: simulate a surround sound arrangement of (say) a centre sound source, front left, front right, rear left and rear right sound sources;
(iii) for 2-D material having lower than a threshold pixel count and/or lower than a threshold data rate and/or lower than a threshold spatial frequency content, either simulate a single front central monophonic sound source, or (if the associated audio material allows for this and the spatial frequency content is above a lower threshold limit) simulate a stereo (front left, front right) arrangement of two sound sources.

These arrangements provide an example of the audio processor acting to simulate a single front central monophonic sound source in respect of audio content associated with video content displayed by a virtual screen of less than a first threshold virtual distance from the wearer; and to simulate multiple sound sources in respect of other audio content.

Accordingly, embodiments of the present invention can provide a head mountable display (HMD) system in which the size and/or distance from the viewer of a virtual screen for display of video material depends upon one or more of the following:
whether the video material is in a 2-D or a 3-D format;
the image resolution of the video material;
the compression quality and/or data rate of the video material;
the aspect ratio of the video material;
the origin of the video material; and
metadata associated with the video material.

In the case of 2-D material, a higher resolution and/or a higher data rate will correspond to a more distant and a larger virtual screen in embodiments of the invention.

In the case of 3-D material, in embodiments of the invention the video material is displayed relatively close to the viewer for example on a virtual screen of no more than 5 m diagonal and no more than 8 m from the user. Preferred values are 2 m diagonal and a separation of 2-3 m from the viewer.

In embodiments of the invention, if metadata defining precautions against window violations is present, this is used in the rendering of the 3-D video material. If not, then the video material is itself analysed and the rendering changed according to the analysis.

In embodiments of the invention, the detection of translation as part of a head tracking detection is not used to vary the virtual viewpoint for video display, so as to avoid creating additional potential window violation problems.

In embodiments of the invention, virtual screens are transitioned gradually between different screen sizes and distances from the viewer.

In embodiments of the invention, videogame cut scenes may be displayed in 2-D, even if the videogame itself is rendered in 3-D.

Embodiments of the invention also provide a system of an HMD, one or more peripheral or control devices, and optionally a base device such as a games console or breakout box.

Embodiments of the present invention can also provide a method of operation of a head mountable display (HMD) system comprising rendering a virtual screen for display of video material to a viewer, in which the size and/or distance from the viewer of the virtual screen depends upon one or more of the following:
whether the video material is in a 2-D or a 3-D format;
the image resolution of the video material;
the compression quality and/or data rate of the video material
the aspect ratio of the video material;
the origin of the video material; and
metadata associated with the video material.

Note that the techniques described above are also applicable to displays other than HMD displays. For example, if a non-HMD display screen, such as a flat panel or curved panel display, has a certain size w·h (where w is the width and h the height of the viewable display area) then a control system corresponding in at least some functionality to the system of FIG. 12 could process input signals for display according to at least some of the criteria discussed above.

In one example, input signals originating as video material of at least a threshold resolution (the threshold applying to total number of pixels and/or to horizontal and/or vertical resolution), then either or both of the full width w and the full height h of the display is used for display of that material. That is to say, in one example, depending on whether the aspect ratio of the video material matches the aspect ratio w:h, the video material is displayed at the full width w of the display, and possibly at the full height h (or a smaller height if a different aspect ratio applies). In another example, for a different aspect ratio, the video material is displayed at the full height h of the display but a width smaller than w. But in other cases, where the video material does not exceed the threshold resolution (as discussed above) then both the display height is smaller than h and the display width is smaller than w. In the example case of a large display (perhaps more than 1 m diagonal) this allows higher resolution material to make use of the available display size, whereas with lower resolution material the arrangement avoids the problem of expanding lower resolution material too far, to the extent that the pixel structure of the lower resolution material becomes subjectively disturbing.

Accordingly, embodiments of the invention can provide a video display system in which the image size at which video material is displayed depends upon the image resolution of the video material and one or more of the following:
whether the video material is in a 2-D or a 3-D format;
the compression quality and/or data rate of the video material;
the aspect ratio of the video material;
the origin of the video material; and
metadata associated with the video material.

Embodiments of the invention can provide a method of operation of a video display, in which the image size at which video material is displayed depends upon the image resolution of the video material and one or more of the following:
whether the video material is in a 2-D or a 3-D format;
the compression quality and/or data rate of the video material;
the aspect ratio of the video material;

the origin of the video material; and metadata associated with the video material.

Other options applicable to the HMD system may also be applied to a non-HMD display.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

Obviously, numerous modifications and variations of the present disclosure are possible in light of the above teachings. It is therefore to be understood that within the scope of the appended claims, the invention may be practiced otherwise than as specifically described herein.

We claim:

1. A head mountable display (HMD) system comprising:
   an HMD having stereoscopic display elements for eyes of a wearer of the HMD, the stereoscopic display elements being configured to provide a virtual screen to the HMD wearer at a rendered virtual position within a three-dimensional display environment; and
   a video processor configured to process video material for display by the stereoscopic display elements of the HMD;
   in which the video processor is configured so that one or both of a size of the virtual screen and a distance from the wearer of the rendered virtual position of the virtual screen within the three-dimensional display environment for display of the video material by the HMD depends upon a spatial frequency content of the video material,
   wherein when a maximum spatial frequency is less than a threshold amount, the system is configured to display the video material on a virtual screen that appears smaller and at a selected rendered virtual position which is closer to the wearer within the three-dimensional display environment than a virtual screen on which video with a maximum spatial frequency above the threshold amount is displayed.

2. A system according to claim 1, comprising:
   a detector configured to detect the spatial frequency content of the video material;
   the video processor being configured to display the video material on a virtual screen having a size and a rendered virtual distance in the three-dimensional display environment from the wearer of the HMD according to the detected spatial frequency content of the video material.

3. A system according to claim 2, in which, in a case where spatial content of the video material indicates a lower capture resolution than a current resolution of the video material, the video processor is configured to display the video material on a virtual screen having a size and a rendered virtual distance in the three-dimensional display environment from the wearer which depend on the capture resolution indicated by the detected spatial frequency content.

4. A system according to claim 1, comprising an audio processor configured to generate audio content in a simulated audio presentation format dependent upon one or both of the size and a rendered virtual distance of the virtual screen in the three-dimensional display environment from the wearer selected by the video processor.

5. A system according to claim 4, in which the HMD comprises a pair of earpieces; and in which the audio processor is configured to supply the generated audio content to the earpieces.

6. A system according to claim 4, in which the audio processor is configured:
   to simulate a single front central monophonic sound source in respect of audio content associated with video content displayed by a virtual screen of less than a first threshold virtual distance in the three-dimensional display environment from the wearer; and
   to simulate multiple sound sources in respect of other audio content.

7. A system according to claim 1, in which, in a case of display of 2-D material, one or both of a higher resolution and a higher data rate correspond to a virtual screen which has a rendered virtual position within the three-dimensional display environment which is more distant and which appears larger.

8. A system according to claim 1, in which, in a case of 3-D material, the video material is displayed on a virtual screen of no more than 5 m diagonal and having a rendered virtual position within the three-dimensional display environment which is no more than 8 m from the user.

9. A system according to claim 1, in which, in a case of 3-D material, the video material is displayed on a virtual screen of no more than 2 m diagonal and having a rendered virtual position within the three-dimensional display environment which is between 2 m and 3 m from the viewer.

10. A system according to claim 1, in which, if metadata defining precautions against window violations is associated with the video material, a window violation occurring when an object in a 3-D environment approaches an edge of a display screen and, by virtue of its position in 3-D space and particular camera arrangements in use, the object appears in only one of a left or a right image but not the other, such metadata defining temporary changes to a lateral extent of the left and right images so as to mask objects which would otherwise give rise to window violations, then the metadata is used in rendering of 3-D video material.

11. A system according to claim 1, in which, if metadata defining precautions against window violations is not associated with the video material, a window violation occurring when an object in a 3-D environment approaches an edge of a display screen and, by virtue of its position in 3-D space and particular camera arrangements in use, the object appears in only one of a left or a right image but not the other, such metadata defining temporary changes to a lateral extent of the left and right images so as to mask objects which would otherwise give rise to window violations, then the system is configured to analyse the video material and to change rendering of the video material according to the analysis.

12. A system according to claim 1, in which the system is configured to detect head movements of the HMD in use, and in which the detection of translation as part of a head tracking detection is not used to vary a virtual viewpoint for video display.

13. A system according to claim 1, the system being configured to transition gradually between different virtual screen sizes and different virtual screen distances from the viewer.

14. A video display system comprising:
    a frame;

at least one a pair of stereoscopic display elements coupled to the frame to provide a three-dimensional display environment; and a video processor arranged in operative communication with the pair of stereoscopic display elements, in which the video processor is configured to generate video material for display, one or both of an image size and a rendered image position within the three-dimensional display environment at which the video material is displayed depending upon an image resolution of the video material and spatial frequency content of the video material, wherein if a maximum spatial frequency is less than a threshold amount, then the video material is configured by the video processor for display on a virtual screen associated with the pair of stereoscopic display elements, the virtual screen configured to appear smaller and at a selected rendered position within the three-dimensional display environment which is closer to a user than a virtual screen on which video with a maximum spatial frequency above the threshold amount is configured for display.

15. A method of operation of a stereoscopic head mountable display (HMD) system operable to provide a three dimensional display environment, comprising:

rendering a virtual screen for display of video material to a viewer of the HMD system, in which one or both of a size and rendered virtual distance from the viewer of the virtual screen within the three-dimensional display environment depends upon spatial frequency content of the video material;

determining, by one or more processors, whether a maximum spatial frequency is less than a threshold amount; and when the maximum spatial frequency is determined to be less than the threshold amount, displaying the video material on a virtual screen that appears smaller and at a selected rendered virtual position within the three-dimensional display environment which is closer to the viewer than a virtual screen on which video with a maximum spatial frequency above the threshold amount is displayed.

16. A method of operation of a stereoscopic video display operable to provide a three-dimensional display environment, in which one or both of an image size and a rendered image position within the three-dimensional display environment at which video material is displayed depends upon an image resolution of the video material and spatial frequency content of the video material, the method comprising:

determining, by one or more processors, whether a maximum spatial frequency is less than a threshold amount; and upon determination that the maximum spatial frequency is less than the threshold amount, preparing the video material for display on a virtual screen that appears smaller and at a selected rendered position within the three-dimensional display environment which is closer to a user of the video display than a virtual screen on which video with a maximum spatial frequency above the threshold amount is displayed.

17. A non-transitory machine-readable storage medium which stores computer software which, when executed by a computer, causes the computer to carry out the method of claim 15.

* * * * *